(12) United States Patent
Guering et al.

(10) Patent No.: US 8,727,277 B2
(45) Date of Patent: May 20, 2014

(54) HOLD LAYOUT DEVICE FOR AN AIRCRAFT FOR CREW-MEMBER REST AND AIRCRAFT COMPRISING SAME

(75) Inventors: Bernard Guering, Montrabe (FR); Jonathan Guering, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 316 days.

(21) Appl. No.: 12/664,411

(22) PCT Filed: Jun. 13, 2008

(86) PCT No.: PCT/FR2008/051069
§ 371 (c)(1),
(2), (4) Date: Dec. 14, 2009

(87) PCT Pub. No.: WO2009/004236
PCT Pub. Date: Jan. 8, 2009

(65) Prior Publication Data
US 2010/0187355 A1    Jul. 29, 2010

(30) Foreign Application Priority Data
Jun. 15, 2007  (FR) ...................................... 07 55795

(51) Int. Cl.
*B64C 1/20* (2006.01)
*B64C 1/22* (2006.01)
*B64D 47/00* (2006.01)

(52) U.S. Cl.
USPC ..................................................... 244/118.1

(58) Field of Classification Search
USPC ..................... 244/118, 118.5, 118.6
See application file for complete search history.

(56) References Cited

U.S. PATENT DOCUMENTS

| | | | | |
|---|---|---|---|---|
| 5,784,836 | A | * | 7/1998 | Ehrick .......................... 52/79.8 |
| 6,152,400 | A | * | 11/2000 | Sankrithi et al. ........... 244/118.5 |
| 2006/0284013 | A1 | | 12/2006 | Guering |
| 2009/0159743 | A1 | | 6/2009 | Guering et al. |

FOREIGN PATENT DOCUMENTS

| | | |
|---|---|---|
| EP | 0 514 650 | 11/1992 |
| EP | 0 901 963 | 3/1999 |
| FR | 2 886 622 | 12/2006 |
| WO | 96 14243 | 5/1996 |

* cited by examiner

*Primary Examiner* — Valentina Xavier
(74) *Attorney, Agent, or Firm* — Oblon, Spivak, McClelland, Maier & Neustadt, L.L.P.

(57) ABSTRACT

The invention relates to a device for developing an aircraft hold located under the floor of the passenger cabin and the cockpit and including a so-called commercial area in which freight can be transported and a technical area including technical equipment and located at the front of the commercial area an at least partially under the cockpit, wherein said device includes: at least one compartment sealed relative to the hold located at the front of said commercial area and at the back of a portion at least of the technical area; a staircase connecting each compartment to a portion of the intermediate floor between the passenger cabin and the cockpit; and a sealed corridor extending from said staircase to each of said sealed compartments.

17 Claims, 6 Drawing Sheets

HOLD LAYOUT DEVICE FOR AN AIRCRAFT FOR CREW-MEMBER REST AND AIRCRAFT COMPRISING SAME

BACKGROUND OF THE INVENTION

This invention relates to a hold layout device for an aircraft for crew-member rest and an aircraft comprising same. It applies, in particular, to the use of the hold to provide a rest, even bedding, area, a cloakroom and/or a baggage bin, for at least one crew member.

In an aircraft, the available space is distributed among the passenger cabin space, the baggage and/or cargo transport hold space, these first two spaces having to be maximized, the cockpit space, and different spaces, for example between the systems cabinets and the portion of the hold able to accommodate standardized containers.

Crew members are asking for an improvement in their comfort and, for the long haul, a rest zone. Moreover, beyond a certain flight duration, the regulations or practices of the airline companies require that a second pilot and copilot pair be present in the aircraft in order to replace the first during the flight. This part of the crew, inactive for a portion of the flight, must have a rest zone. Finally, the members of the crew wish to be able to leave the aircraft and the destination airport as rapidly as possible, carrying their baggage and garments along with them without waiting for the contents of the hold to be brought to the baggage delivery zone of the airport involved.

It is known to have a zone comprising equipment items intended for the comfort of the crew between the crew station and the passenger cabin. These equipment items, however, consume useful space in the aircraft and reduce the space that could be made available to the passengers.

The document FR 2 886 622 describes a rest module positioned beneath the cockpit zone. The implementation of this module, however, would require the moving of a technical portion that should remain beneath the cockpit.

SUMMARY OF THE INVENTION

This invention seeks to address these requirements.

To this end, according to a first aspect, this invention applies to a hold layout device for an aircraft, the said hold being located below a passenger cabin and cockpit floor and comprising a zone referred to as "commercial" in which goods can be transported and a technical zone comprising technical equipment items and positioned in front of the commercial zone and, at least in part, below the cockpit, characterized in that it comprises:

at least one compartment impervious in relation to the hold positioned in front of the said commercial zone and behind at least one portion of the technical zone, stairs connecting each said compartment with a portion of the floor intermediate between the passenger cabin and the cockpit and an impervious aisle going from the said stairs to each said impervious compartment.

By virtue of these arrangements, members of the crew can have at least one compartment, for example for placing baggage, garments and/or for resting. Moreover, because of the imperviousness in relation to the hold, the smoke and/or fire protection systems can be adapted to the possibility of a human presence in a compartment or in the aisle during the flight. The stairs and the impervious aisle also make it possible to access, on the one hand, at least one portion of the technical zone and, on the other hand, the impervious compartment. In this way the stairs and the aisle provide both a commercial function, for the comfort of the crew, and a technical function, for access to the technical zone for maintenance or repair.

According to specific characteristics, at least one said compartment comprises at least one bedding arrangement. By virtue of these arrangements, crew members can rest in the said impervious compartment.

According to specific characteristics, at least one said compartment extends more or less laterally from one inner wall of the aircraft to the other. By virtue of these arrangements, the space available for the crew members is almost as broad as the aircraft.

According to specific characteristics, at least one said compartment has a general right-angled parallelepiped shape, two lower edges of which are truncated to correspond to the shape of the fuselage of the aircraft at the lower part above the hold floor.

According to specific characteristics, at least one said compartment is made up of panels and of a structure supporting the said panels and resting on at least one technical equipment item. By virtue of these arrangements, a special self-supporting structure is avoided and the weight and cost of the compartment are reduced. Moreover, in this way a compartment can occupy an aisle useful only for maintenance or repair operations involving these equipment items. Moreover, each panel thus can be removed independently of the other panels.

According to specific characteristics, at least one said compartment is made up of panels that can be disassembled or are articulated. By virtue of these arrangements, access to the technical zone is facilitated and/or the commercial zone space easily can be increased. It is noted that the articulated panels are either doors or are articulated on a horizontal axis and that the panels that can be disassembled preferably are equipped with quick fastenings, for example of the "quarter-turn" type. In this way, programmed maintenance-system type access, for example access to the wiring, is facilitated and rapid.

According to specific characteristics, at least one compartment comprises:

a structure suitable for holding coat hangers, a wall impervious in relation to the hold supported by the said structure and positioned in front of at least one opening for a technical equipment item located in the said hold and means for moving at least one portion of the said wall in order to clear the access to the said opening.

By virtue of these arrangements, members of the crew can have a zone for placing garments by using a location needed for operations of maintenance or repair of technical equipment items of the aircraft, without hindering these operations which generally take place on the ground, when no crew is in the aircraft, since the openings for the technical equipment items remain accessible. Moreover, because of the imperviousness in relation to the hold, the smoke and/or fire protection systems can be adapted to possible human presence near this cloakroom.

According to specific characteristics, the said structure forms at least one rail on which the said wall can slide in order to clear the access to the said opening.

According to specific characteristics, the said wall is flexible. Access to the technical equipment items thus is particularly easy.

According to specific characteristics, at least one said compartment comprises:

a wall impervious in relation to the hold and positioned in front of at least one opening for a technical equipment item located in the said hold, a structure suitable for supporting the said wall and
means for moving at least one portion of the said wall in order to clear the access to the said opening.

By virtue of these arrangements, members of the crew can have a zone for placing baggage by using a location needed for operations of maintenance or repair of technical equipment items of the aircraft, without hindering these operations which generally take place on the ground, when no crew is in the aircraft, since the openings for the technical equipment items remain accessible. Moreover, because of the imperviousness in relation to the hold, the smoke and/or fire protection systems can be adapted to possible human presence near this baggage bin.

According to specific characteristics, the said wall is removable. By virtue of these arrangements, for lengthy maintenance operations, the wall is removed so that it does not hinder these operations.

According to specific characteristics, the said wall is mounted on the said structure with quick screws.

According to specific characteristics, the device such as briefly explained above comprises an access through which garments or baggage can be passed and a door positioned at a distance from the said access.

By virtue of these arrangements, the door makes it possible to perform maintenance operations easily.

According to particular characteristics, the said door is located at the back, in relation to the said access.

According to a second aspect, this invention applies to an aircraft comprising a layout device such as briefly explained above.

According to specific characteristics, at least one compartment is positioned between two technical equipment items. By virtue of these arrangements, the device occupies an aisle useful only for maintenance or repair operations involving these equipment items.

Since the advantages, purposes and characteristics of this aircraft are similar to those of the device that is an object of this invention, such as briefly explained above, they are not repeated here.

Other advantages, purposes and characteristics of this invention will become apparent from the description that is going to follow, presented with an explanatory and in no way limitative intent, with reference to the attached drawings.

DETAILED DESCRIPTION OF THE PREFERRED EMBODIMENTS

Figure 1:
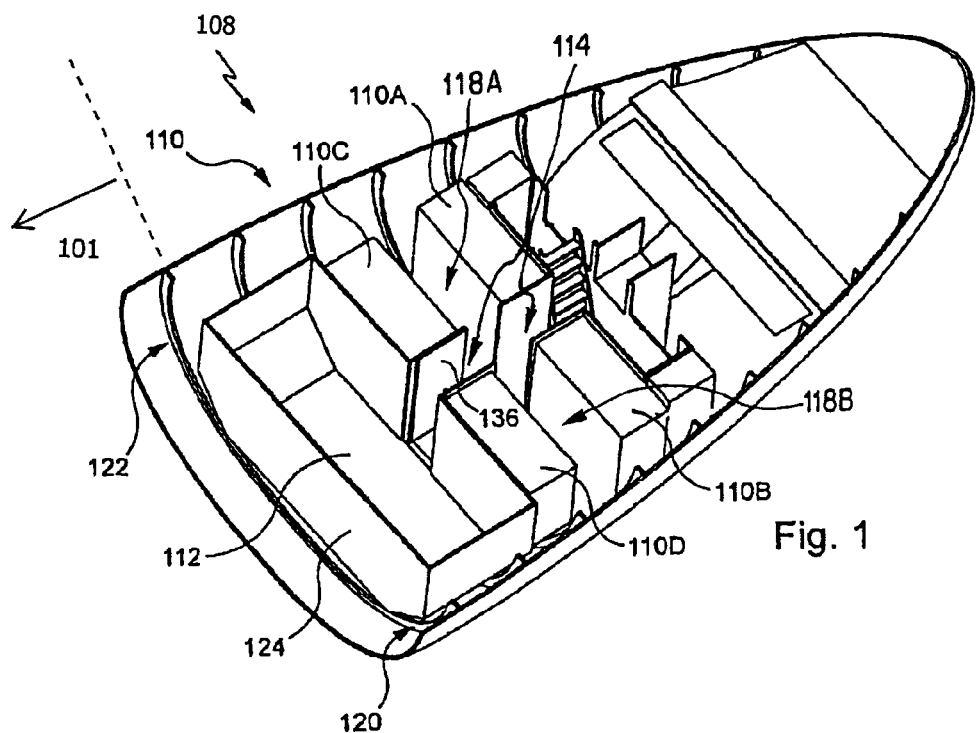
FIG. 1 shows schematically, in perspective, a section of an aircraft that is an object of this invention comprising a specific embodiment of the layout device that is the object of this invention.
Figure 2:
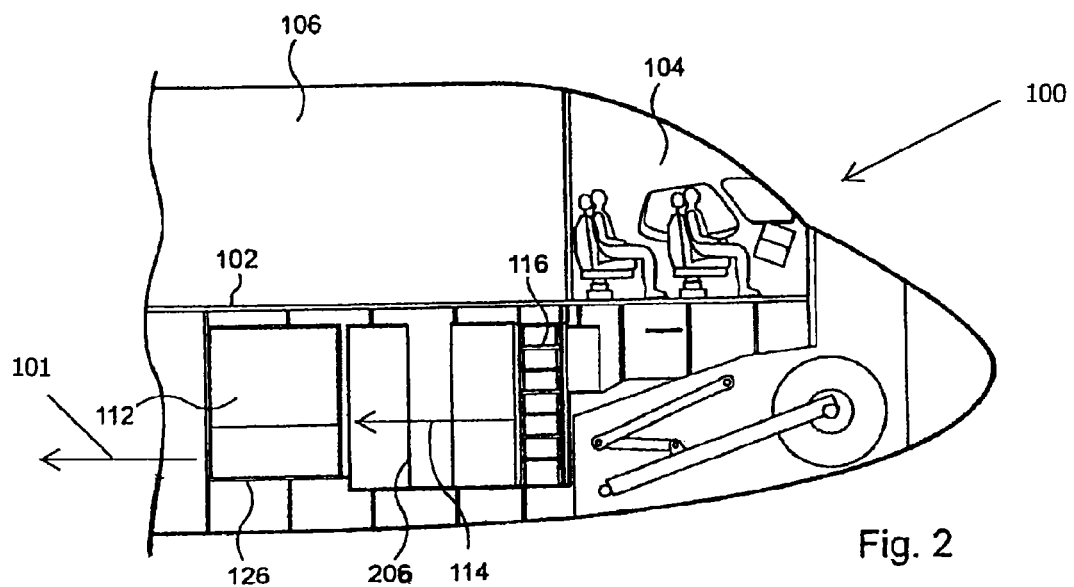
FIG. 2 schematically shows a vertical section of the aircraft illustrated in FIG. 1.

There is seen, in FIGS. 1 and 2, an aircraft comprising a first zone 101, a floor 102, a floor 102, a cockpit 104, a passenger cabin 106, a hold 108, a technical zone 110 and a rest compartment 112 for crew members.

Aircraft 100 is of any type. It has a metal fuselage and a metal or carbon structure. Technical zone 110 extends from the nose of the fuselage of the aircraft to below the passenger cabin. Technical zone 110 and compartment 112 are connected, by means of an aisle 114 and stairs 116, to a hatch formed in floor 102 and opening between cockpit 104 and passenger cabin 106.

In the embodiment described and shown, aisle 114 starts from the stairs and, toward the rear of aircraft 100, first passes, in a portion of the technical zone, between two technical equipment items 110A and 110B, then between two short aisles 118A and 118B orthogonal to aisle 114 and each separating two technical equipment items, respectively 110A and 110C on the one hand, and 110B and 110D on the other hand, then between the other two technical equipment items 110C and 110D, before reaching rest compartment 112.

Rest compartment 112 has the shape of a right-angled parallelepiped extending more or less from right side wall 120 of aircraft 100 to left side wall 122 of aircraft 100. The lower side edges of this right-angled parallelepiped are truncated to adapt the lateral shape of compartment 112 to the rounded cross section of aircraft 100 and in this way to correspond to the shape of the fuselage of aircraft 100 at the lower portion above hold floor 126 and below floor 102 of the cabin and the cockpit.

Rest compartment 112 is made up of rigid panels 124 forming floor, walls and ceiling, mounted on a structure (not shown) supported on floor 126 of hold 108 and on technical equipment items 110C and 110D. Panels 124 are, for example, made of composite materials, plastic, metal, or wood. The spaces between the panels comprise joints (not shown) that ensure the imperviousness of rest compartment 112 in relation to hold 108. A door 136 allows access to compartment 112 from aisle 114. To enhance acoustic comfort, the assembly also can be fastened by means of flexible studs.

Compartment 112 can be disassembled by virtue of the use, for its assembly, of quick, for example quarter-turn, screws, of panels and of joints ensuring imperviousness. In this way, on the occasion of reassignment of an aircraft to shorter flights or on the occasion of a need for extension of the first zone 101 of the hold 108, compartment 112 can be disassembled. The door initially connecting compartment 112 to aisle 114 then ensures imperviousness in relation to hold 108, of the rest of the layout device that is an object of this invention, such as presented in FIGS. 3 to 12.

Figure 13:
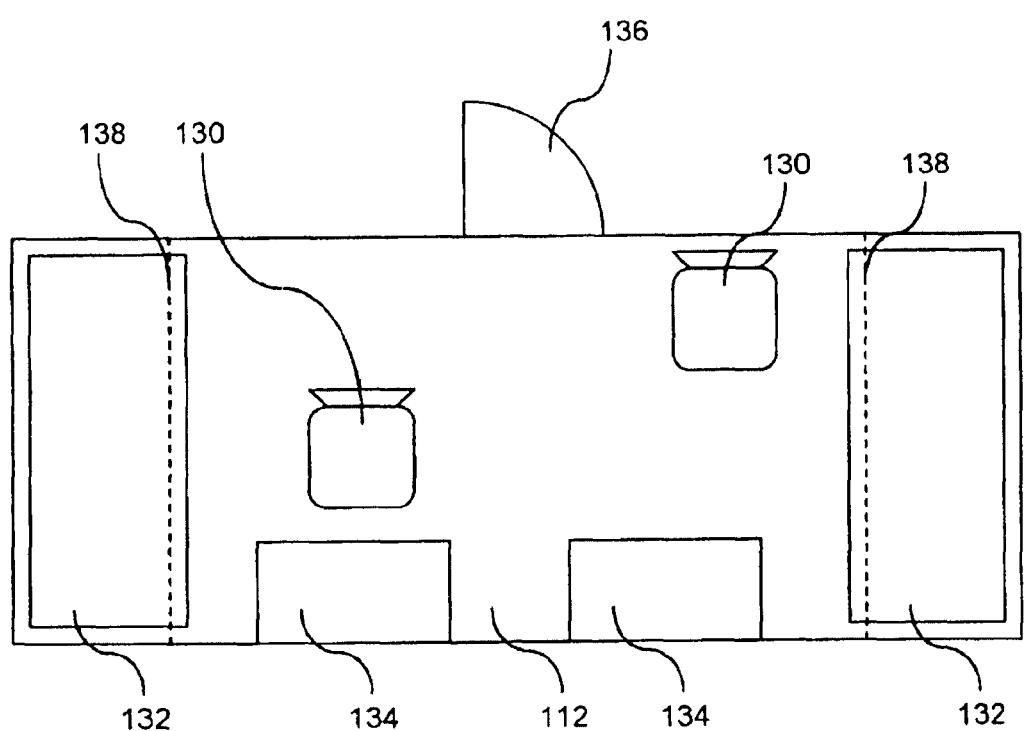
FIG. 13 schematically shows a view from above of the compartment illustrated in FIGS. 1 and 2.

As illustrated in FIG. 13, the equipment of rest compartment 112 comprises, for example, two seats 130, two bedding arrangements 132, positioned above truncated edges 138 of compartment 112 and two shelves 134. Means for lighting, air conditioning, entertainment and detection and protection against smoke and fire, known in themselves in particular for equipping the passenger cabin, are not shown in FIG. 13.

Figure 3:
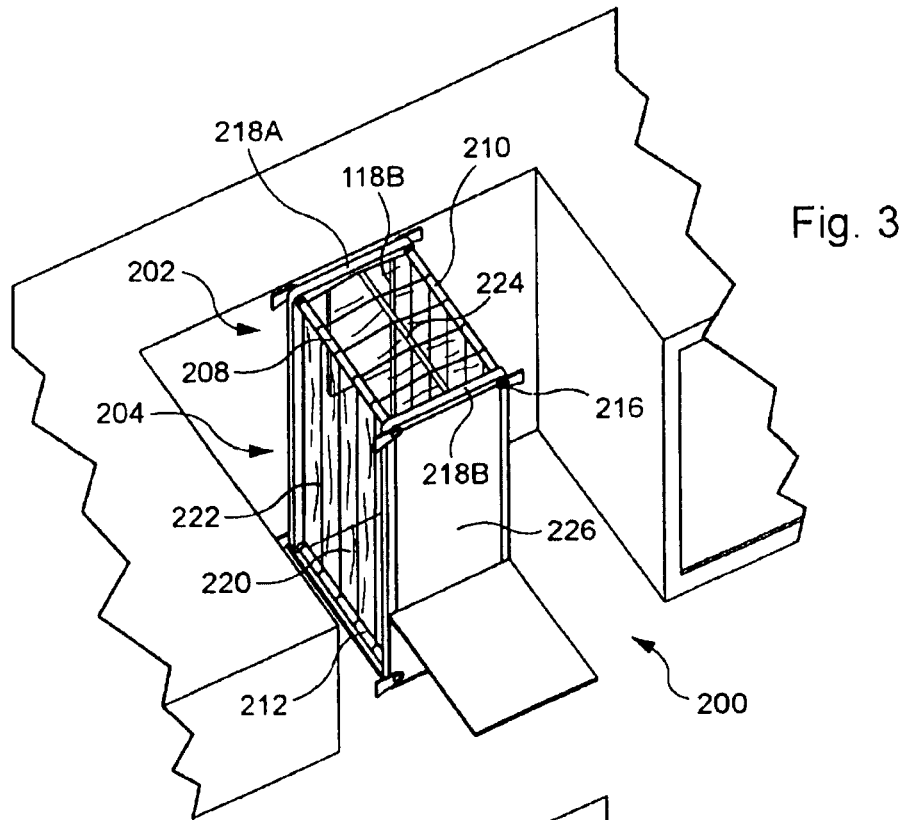
FIG. 3 shows schematically, a perspective view including a flexible cloakroom that is an object of this invention, in a deployed configuration.

There is seen in FIG. 3 a cloakroom 200 positioned in aisle 118B, between technical equipment items 110B and 110D and comprising:
- a structure 202 holding coat hangers for garments (not shown),
- a wall 204, impervious in relation to hold 108, supported by the said structure and positioned in front of at least one opening 206 for technical equipment items 110B and 110D and
- means for moving at least one portion of the said wall in order to clear the access to each said opening 206.

Structure 202 comprises upper bars 208 and 210 and lower bars 212 and 214, each bar being mounted between two supports 216 fastened to technical equipment items 110B and 110D. Bars 208 to 214 preferentially are attached to supports 216 by quick, or quarter-turn screws, so as to make wall 204 removable. In order to enhance acoustic comfort, the assembly also can be fastened by means of flexible studs.

Wall 204 is made up of two support frames 218A and 218B sliding on the four bars 208 to 214 and of a plastic film 220 going from one frame to the other over the entire extension thereof. Plastic film 220 is held along the bars by metal wires 222 attached to plastic film 220, each metal wire 222 sliding on each of bars 208 to 214 when one of the frames is moved along these bars. In variants, plastic film 220 of wall 204 is replaced by an accordion-pleated fabric, the folds being able to be reinforced in various ways with metal wires, for example. The material making up wall 204 is fireproof.

A compressible or removable coat-hanger holder 224, going from one frame to the other in a parallel manner and in the middle of upper bars 208 and 210, is held by metal wires 222. This hanger holder 224 is, for example, made up of a removable rigid bar or of rods articulated to assume a lengthwise configuration when the frames are moved away from one another, and a folded position when the frames are moved closer to one another.

Support frame 218A, which is on the aisle 114 side, frames an opening through which a crew member can pass a garment to hang, with a coat hanger, on holder 224 or to remove this garment.

Support frame 218B frames a door 226.

Figure 4:
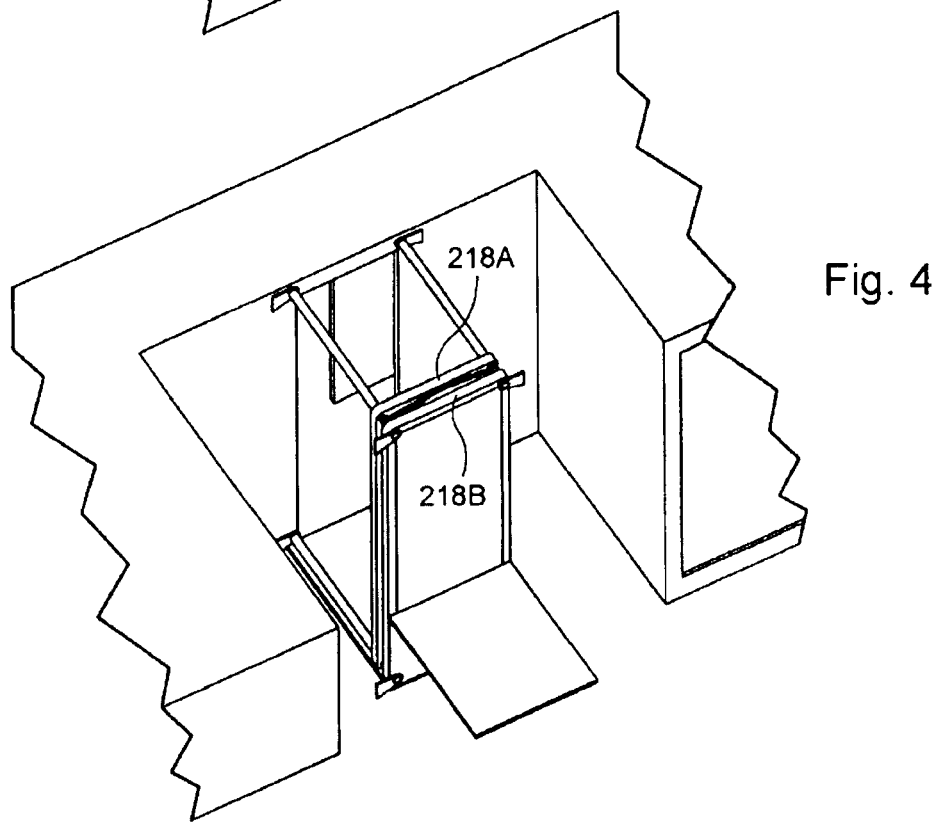
FIG. 4 shows schematically, a perspective view including the flexible cloakroom illustrated in FIG. 3, in a first compressed configuration.

As is seen on FIG. 4, in order to access the openings for technical equipment items 110B and 110D, the maintenance or repair technicians can remove holder 224, if it is rigid, and have support frame 218A slide toward support frame 218B which brings about the folding and compression of wall 204, holder 224, if it is flexible, and the sliding of metal wires 222. This procedure is more suitable for access to the technical equipment items located on both sides of aisle 118B.

Figure 5:
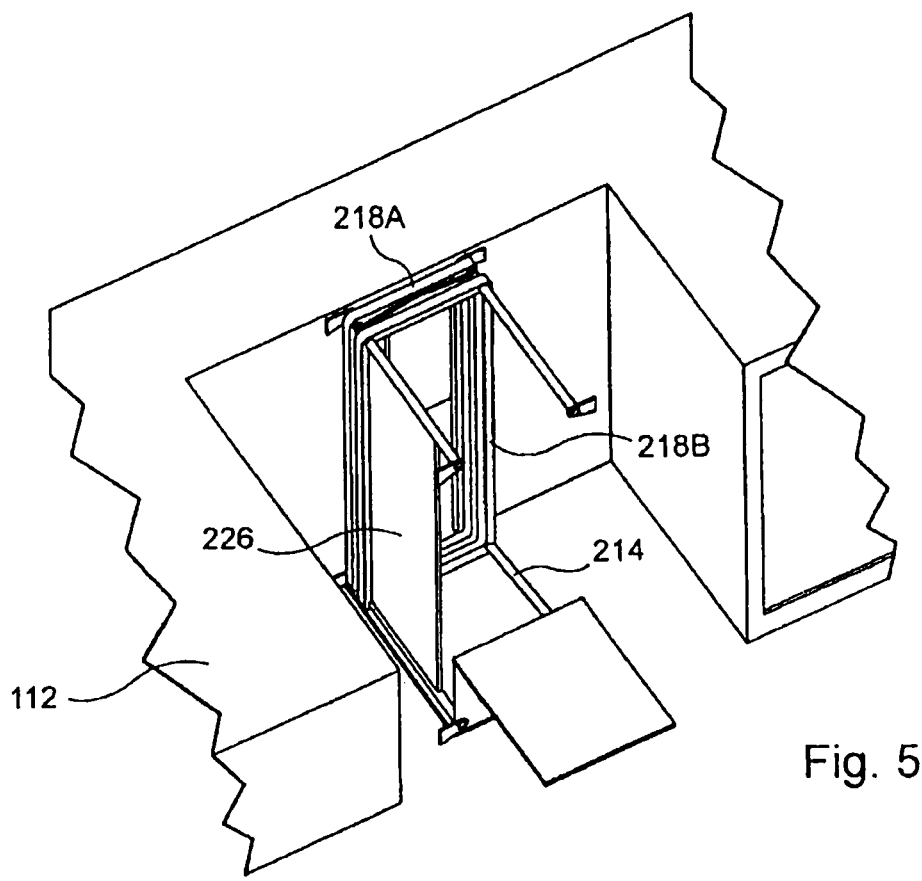
FIG. 5 shows schematically, a perspective view including the flexible cloakroom illustrated in FIGS. 3 and 4, in a second compressed configuration.

As is seen in FIG. 5, in order to access the openings for technical equipment items 110B and 110D, the maintenance or repair technicians also can remove holder 224, if it is rigid, and have support frame 218B slide toward support frame 218A which brings about the folding and compression of wall 204, of holder 224, if it is flexible, and the sliding of metal wires 222, then open door 226 by pulling it toward the inside of the cloakroom. This procedure is more suitable for access to the technical equipment items located at the back of aisle 118B.

As is understood with respect to FIGS. 3 to 5, by virtue of the cloakroom the members of the crew have a zone for placing garments by using a location needed for operations of maintenance or repair of technical equipment items of the aircraft, without hindering these operations which generally take place on the ground, when no crew is in the aircraft, since the openings for the technical equipment items remain accessible. Moreover, because of the imperviousness in relation to the hold, the smoke and/or fire protection systems can be adapted to possible human presence near this cloakroom.

Wall 204 preferentially is removable, for example after bars 208 to 214 have been separated from their supports 216, for example by unscrewing quick screws, for example screws referred to as "quarter-turn" since a quarter turn suffices to remove them. Thus, for lengthy maintenance operations, the wall is removed so that it does not hinder these operations.

Figure 6:
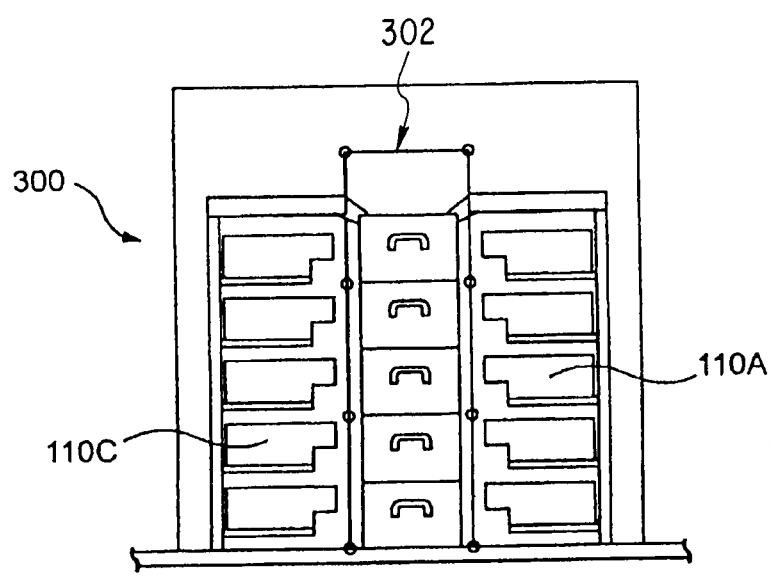
FIG. 6 shows schematically, a vertical section including a baggage storage bin that is an object of this invention.

There is seen in FIG. 6 a baggage bin 300 situated in aisle 118A, in front of at least one opening for each technical equipment item 110A and 110C and comprising:
- a structure 302,
- a wall 304, impervious in relation to the hold, supported by said structure 302 and positioned in front of at least one access to a technical equipment item and
- means for moving at least one portion of the said wall in order to clear the access to the said opening, these means here being means for rapid disassembly of portions of the wall.

As is seen in FIG. 6, structure 302 is attached to each of technical equipment items 110A and 110C, at four different heights, for example by quick or "quarter-turn" screws. Structure 302 also comprises two frames 306 of doors 308 positioned at the entrance and at the back of aisle 118A. In FIG. 6, five bags, of carry-on type, are shown stacked on top of each other, by way of example.

Figure 7:
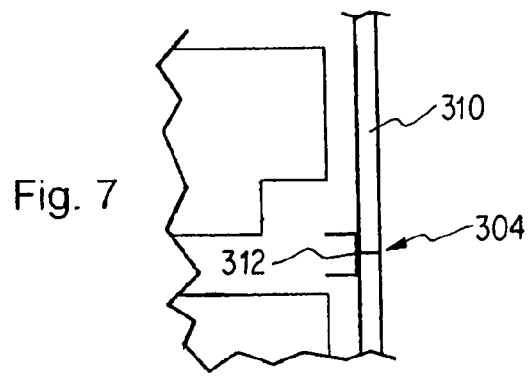
FIGS. 7 and 8 show perspective views including a portion of the bin illustrated in FIG. 6.
Figure 8:
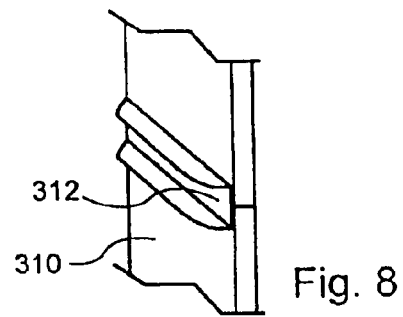
Figure 9:
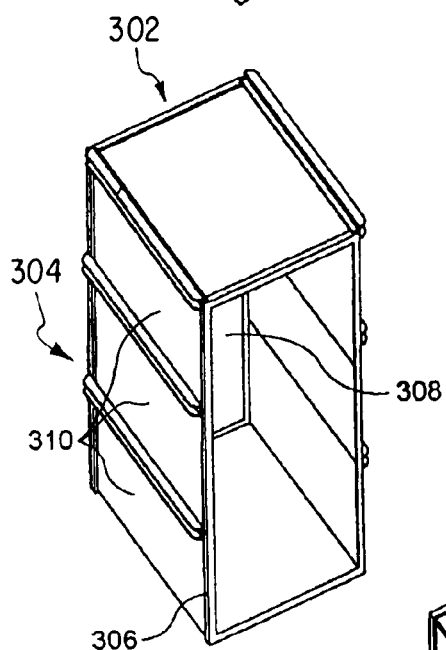
FIG. 9 shows schematically, a perspective view including the bin illustrated in FIGS. 6 to 8.

As is seen on FIGS. 7 and 8, components 310 of wall 304 are panels separated by supports 312. Panels 310 are, for example, made of plastic, metal or composite material. On FIGS. 7 and 8, the inside of the baggage bin is shown at the right.

Figure 10:
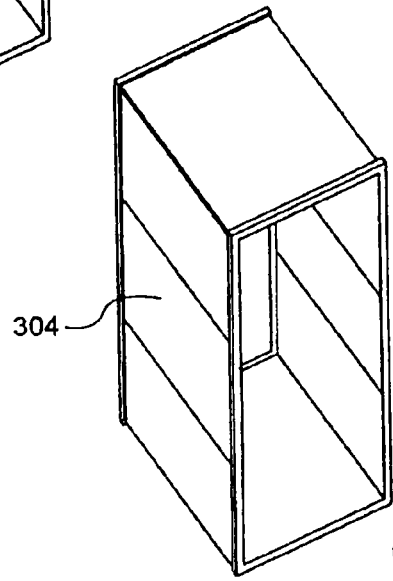
FIGS. 10 and 11 schematically show, perspective views including components of the bin illustrated in FIGS. 6 to 9.
Figure 11:
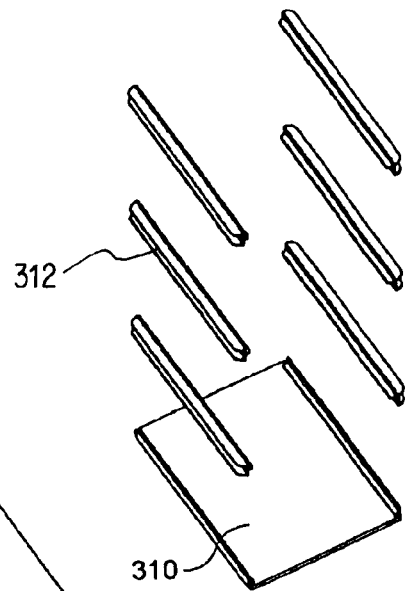
Figure 12:
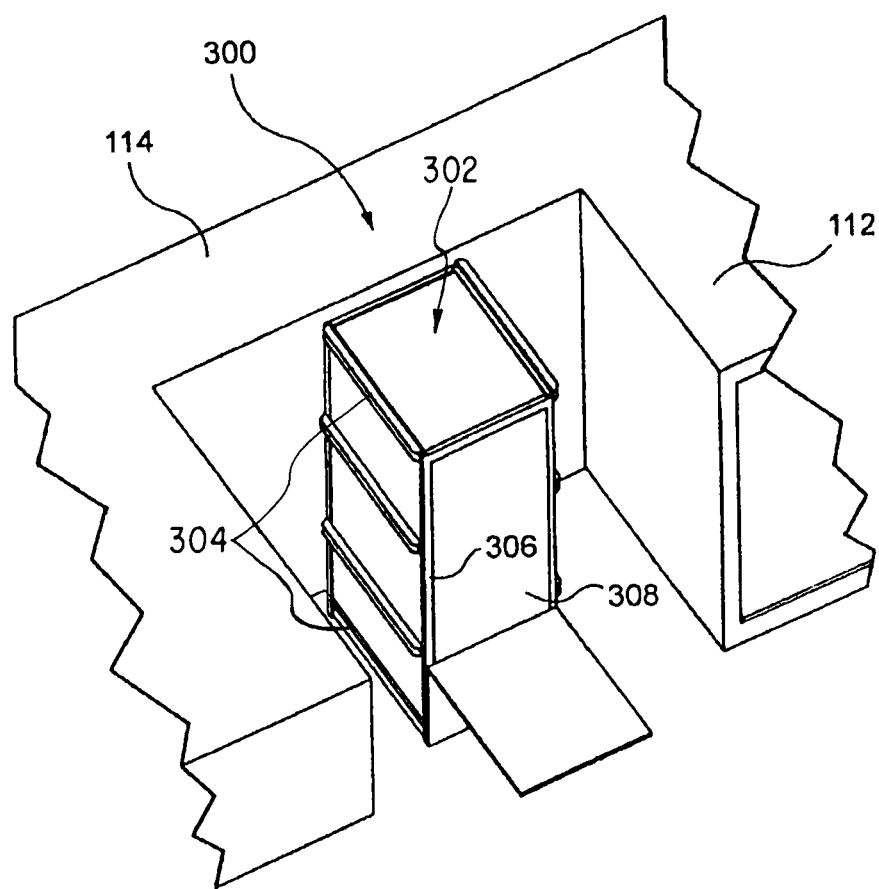
FIG. 12 shows schematically, a perspective view including the bin illustrated in FIGS. 6 to 11, installed in an aircraft, technical equipment items not being shown in order to aid understanding of this invention.

The bin is made up of panels that can be disassembled rapidly for access to the systems, as FIG. 10 shows, and of components that cannot be disassembled rapidly shown in FIG. 11. These components of structure 302, in the form of light beams, are fastened to the units for technical equipment items 110A to 110D, in particular between two levels of computers, precisely at shelf height, as illustrated in FIG. 7. The horizontal beams are fastened on both sides of the shelves on the vertical uprights of the technical equipment unit supporting the shelves.

As is understood with respect to FIGS. 6 to 12, by virtue of the baggage bin, the members of the crew have a zone for placing garments by using a location needed for operations of maintenance or repair of technical equipment items of the aircraft, without hindering these operations which generally take place on the ground, when no crew is in the aircraft, since the openings for the technical equipment items remain accessible. Moreover, because of the imperviousness in relation to the hold, the smoke and/or fire protection systems can be adapted to possible human presence near this baggage bin.

Because the structure is adapted for being attached to technical equipment items, it does not have to be self-supporting and its weight therefore is reduced.

In order to access equipment items situated at the back of aisle 118A, the technicians can open door 308 at the back of the aisle by pulling this door toward the inside of the baggage bin. In the embodiment illustrated in FIGS. 6 to 12, wall 304 is removable, by panels. In other embodiments, the wall can be mounted, by components, on hinges, or be flexible.

As is understood with respect to FIGS. 3 to 12, each compartment of the device that is an object of this invention can come to be disassembled, for example on the occasion of change of mission of the aircraft or on the occasion of access for heavy maintenance. In this case, the components of the compartments can be disassembled separately, or as a whole if the component is of the one-piece compartment type instead, and removed via the cargo door situated just behind the technical zone on the right side of the aircraft.

The invention claimed is:

1. An apparatus for a layout of a hold for an aircraft, the hold being located below a floor of a passenger cabin and a cockpit and including steps, a first zone in which goods can be transported, a technical zone positioned in front of the first zone and at least partially below the cockpit and including a plurality of technical equipment items that are spaced apart, and an aisle, the apparatus comprising:
   at least one compartment having a plurality of rigid supports attached to an exterior of the at least one compartment and a plurality of walls removably attached to the plurality of rigid supports, the plurality of rigid supports support the plurality of walls and rest on at least one of the plurality of technical equipment items having a computer, and the at least one compartment is positioned in front of the first zone and behind at least one portion of the technical zone,
   wherein the steps connect the at least one compartment to another portion of the floor intermediate between the passenger cabin and the cockpit, and
   wherein the aisle is provided from the steps to the at least one compartment and between the plurality of technical equipment items.

2. The apparatus according to claim 1, wherein the at least one compartment comprises at least one bedding arrangement.

3. The apparatus according to claim 1, wherein the at least one compartment extends laterally in a direction from one inner wall of the aircraft to an other inner wall.

4. The apparatus according to claim 1, wherein the at least one compartment has a general right-angled parallelepiped shape with two lower edges that are truncated to correspond to a shape of a fuselage of the aircraft at a lower part of the fuselage that is above a hold floor.

5. The apparatus according to claim 1, wherein at least one of the plurality of walls of the at least one compartment is a door that is supported by at least one of the plurality of rigid supports.

6. The apparatus according to claim 1, wherein the plurality of walls are panels that can be disassembled or articulated.

7. The apparatus according to claim 1, wherein the at least one compartment further comprises:
   a structure suitable for holding a plurality of coat hangers;
   at least one wall of the plurality of walls is positioned in front of at least one opening for at least one of any of the plurality of technical equipment items; and
   a means for removing at least one portion of the at least one wall in order to clear an access to the at least one opening.

8. The apparatus according to claim 7, wherein the means for removing the at least one portion of the at least one wall comprises at least one rail disposed on the plurality of rigid supports, wherein the at least one wall slides on the at least one rail in order to clear the access to the at least one opening.

9. The apparatus according to claim 8, wherein the at least one wall is flexible.

10. The apparatus according to claim 1, wherein the at least one compartment further comprises:
    at least one wall of the plurality of walls that is positioned in front of at least one opening of at least one of any of the plurality of technical equipment items;
    a structure suitable for supporting the at least one wall and baggage; and
    a means for removing at least one portion of the at least one wall in order to clear an access to the at least one opening.

11. The apparatus according claim 10, wherein the at least one wall is removable.

12. The apparatus according to claim 11, wherein the means for removing the at least one portion of the at least one wall comprises quick screws, wherein the at least one wall is mounted on the structure with the quick screws.

13. The apparatus according to claim 1, wherein the at least one compartment further comprises an access through which garments or baggage can be passed and a door positioned at a distance from the access.

14. The apparatus according to claim 13, wherein the door is located at a back of the at least one compartment in relation to the access.

15. An aircraft comprising the apparatus according to claim 1.

16. The aircraft according to claim 15, wherein the at least one compartment of the apparatus is positioned between two technical equipment items.

17. The apparatus of claim 1, wherein at least one of the plurality of walls of the at least one compartment is a door that is supported by at least one of the plurality of rigid supports and the door moves into the at least one compartment to provide a door opening.

* * * * *